3,075,005
Patented Jan. 22, 1963

3,075,005
PRODUCTION OF DINONYLNAPHTHALENE SULFONATES
Robert L. Carden, Poteau, and George C. Feighner and David W. Marshall, Ponca City, Okla., assignors to Continental Oil Company, Ponca City, Okla., a corporation of Delaware
No Drawing. Filed Oct. 5, 1959, Ser. No. 844,157
11 Claims. (Cl. 260—505)

The present invention relates to the production of oil-soluble sulfonates. More particularly, it relates to a process for producing dinonylnaphthalene sulfonates of high purity in good yields.

The use of oil-soluble sulfonates as detergents in lubricating oils has been practiced for several years. Initially, the mahogany sulfonates were used almost exclusively. More recently, sulfonates of postdodecylbenzene, which is a by-product of the manufacture of dodecylbenzene, have been used. Both of these materials, when subjected to proper treatment, have been very satisfactory for this purpose. However, the demand for oil-soluble sulfonates has been increasing at such a rate that it would be advantageous to have available other oil-soluble sulfonates. Sulfonates derived from the dialkylnaphthalenes, and in particular those having molecular weights in the range of dinonylnaphthalene and above, are particularly suitable for use as detergents in lubricating oils.

Among the desirable features for a process for producing oil-soluble sulfonates are (1) a good yield, in order that the process be economical, and (2) high purity, in order that the product be satisfactory for lubricating oil detergents. It is particularly desirable to have available a sulfonate which is satisfactory for producing over-based detergents by the process of U.S. Patent No. 2,861,951 issued November 25, 1958, to Robert L. Carlyle. The prior art processes, when applied to dinonylnaphthalene as the sulfonating stock, have been deficient in at least one of these requirements.

It is an object of the present invention to provide a process for the production of dinonylnaphthalene sulfonates in good yields. It is another object of the present invention to provide a process for the production of dinonylnaphthalene sulfonates having a high purity. It is still another object of the present invention to provide a process for the production of dinonylnaphthalene sulfonates suitable for the preparation of over-based detergents. Other objects and advantages of the invention will become apparent from the following description thereof.

Broadly stated, the present invention provides a process for the production of dinonylnaphthalene sulfonates, in which the process comprises the steps of:

(a) Sulfonating dinonylnaphthalene, dissolved in a nonaromatic hydrocarbon solvent having a boiling point less than 150° C., with a sulfonating agent.
(b) Quenching the reaction mixture with from 0.09 to 0.18 part of water per part of sulfonating agent,
(c) Dilution of the reaction mixture with a nonaromatic hydrocarbon solvent to a total of 2.5 to 4.5 parts of solvent per part of dinonylnaphthalene,
(d) Allowing the reaction mixture to stratify and removing the sludge,
(e) Neutralizing the sulfonic acid with a base,
(f) Washing the solution of sulfonate with water,
(g) Allowing the aqueous and hydrocarbon layers to stratify and removing the aqueous layer,
(h) Removing solvents and residual water from the dinonylnaphthalene sulfonate.

Before proceeding to specific examples which illustrate our invention, it might be better, first, to define the materials and operating conditions of our invention. For reason of brevity, dinonylnaphthalene will often be referred to as DNN hereafter.

The dinonylnaphthalene which we prefer to use as a sulfonating stock is prepared by the alkylation of nonene and naphthalene. The nonene used in the alkylation is not a pure compound, but a mixture of olefins. The preferred material is a by-product of the polymerization of propene using a phosphoric acid-kieselguhr catalyst at about 1000 p.s.i.g. and 400° F. The catalytic polymerization of propylene resulting in the formation of by-product nonene is illustrated in the patent to Grote et al., U.S. Patent No. 2,457,146, the nonene being described therein as low-boiling polymer (C6–C12) a portion of which is recycled through line 32 and the remainder of which is withdrawn through line 33. The "true" nonene portion is highly branched and contains tertiary carbon atoms. The following physical properties are typical of the nonene used:

| | |
|---|---|
| A.P.I. gravity | 62.2 |
| Initial boiling point | °F 127 |
| 10% | °F 240 |
| 50% | °F 274 |
| 90% | °F 303 |
| End point | °F 326 |

Mass spectrometer analyses of two typical nonene samples are given in Table I.

TABLE I

*Mass Spectrometer Analyses of Typical Nonene Samples*

| Compound | Sample (liquid volume percent) | |
|---|---|---|
| | A | B |
| $C_5$ and less | 2.7 | |
| $C_6$ | 3.0 | |
| $C_7$ | 7.2 | 7.0 |
| $C_8$ | 12.8 | 14.7 |
| $C_9$ | 45.3 | 55.5 |
| $C_{10}$ | 23.1 | 19.1 |
| $C_{11}$ | 5.4 | 3.4 |
| $C_{12}$ | 0.5 | 0.3 |

In the prepartion of the DNN the material distilling above 250° C. at 20 mm. Hg pressure is the desired DNN. A representative distillation curve of the DNN is shown in Table II.

TABLE II

*Distillation[1] of Typical DNN Samples*

[20 mm. Hg pressure]

| Sample | A | B | C |
|---|---|---|---|
| Gravity, °API | 21.8 | 22.2 | 22.6 |
| 5% | 400 | 409 | 390 |
| 10% | 402 | 414 | 396 |
| 20% | 404 | 418 | 403 |
| 30% | 407 | 423 | 408 |
| 40% | 410 | 427 | 412 |
| 50% | 414 | 432 | 415 |
| 60% | 419 | 438 | 420 |
| 70% | 426 | 447 | 427 |
| 80% | 438 | 462 | 440 |
| 90% | 465 | 490 | 468 |
| 95% | 499 | 520 | 497 |
| E.P. | 527 | 548 | 520 |
| Recovered, Percent | 97.0 | 97.5 | 97.5 |

[1] A.S.T.M. method D-1160.

A nonaromatic hydrocarbon solvent is used for the DNN. A preferred solvent is hexane, with suitable solvents being pentane and petroleum naphtha which has been treated to remove aromatic constituents. We have found the solvent to DNN ratio is important in both the sulfonation step and the settling step. In order to produce a good quality sulfonate the ratio of total solvent to DNN should be between 2.5 and 4.5 (preferably 4) parts of solvent per part of DNN (weight basis) in the settling step. Two methods may be used in arriving at the desired total solvent to DNN ratio. In one method a lesser amount of solvent is used in the sulfonation step with the remainder of the solvent being added in the settling step. In this method a minimum of about 1 part of solvent per part of DNN (weight basis) is used in the sulfonation step. This method gives both a high yield, based on oleum used, and a good quality sulfonate. In the second method the same amount of solvent is used in both the sulfonation and settling step. This amount of solvent may vary from 2.5 to 4.5 (preferably 4) parts of solvent per part of DNN (weight basis). In this method additional oleum is needed to give yields comparable with the first method. However, a slightly better quality sulfonate is obtained in this method.

Suitable sulfonating agents include oleum (10 to 50%) and sulfur trioxide. The preferred sulfonating agent is 20 percent oleum because of its being readily available. The amount of sulfonating agent is preferably from 1.0 to 1.5 parts (weight) per part of DNN.

We have found that in order to obtain optimum results the amount of water used in the quenching step is important. An amount of water below about 0.09 part per part of 20 percent oleum is insufficient to quench the reaction and remove impurities sufficiently. On the other hand as the amount of water is increased above 0.18 part per part of 20 percent oleum the yield of sulfonate decreases. When less than optimum results are suitable it is possible to operate outside of the preceding range. When other sulfonating agents are used, the water ratio should be adjusted to give a similar water to $SO_3$ ratio. For example, the preceding 0.09 part per part of 20% oleum corresponds to about 0.10 part per part of total $SO_3$. Other ratios are proportionate.

The sulfonation reaction is conducted at a temperature of 40° C. or less. The reaction time is not critical. As is well known to those skilled in the sulfonation art, an insufficient time will give low yields, while an excess time will cause charring and decomposition of the sulfonatable material. When our process is conducted batch-wise, reaction times of 3 minutes to 1 hour are suitable. When the process is conducted on a continuous basis with good agitation, contact times of a few seconds are suitable.

The basic compounds which can be used to neutralize the dinonylnaphthalene sulfonic acid are limited by the requirements of the water-washing step. Accordingly, they should meet the following requirements: (1) their sulfates must be water soluble and (2) their low-molecular-weight sulfonate derivatives must be water soluble. Preferred basic compounds are those in which the cation is an alkali metal or ammonium and in which the anion is a hydroxide or carbonate. The stoichiometric amount, or a slight excess thereof, is used.

The water washing of the sulfonate is conducted to remove low-molecular-weight material which is water soluble and oil insoluble. The amount of water must be controlled to avoid forming emulsions. In addition, the washing must be conducted on a sulfonate, not a sulfonic acid, to avoid formation of emulsions. We have found a suitable range of the ratio of water to DNN (on a weight basis) to be 2 to 4, with a preferred ratio being in the range of 2.5 to 3.5.

The solvents are removed from the DNN sulfonate by heating to 150° C. The removal of the residual water may be facilitated by blowing the product with an inert gas (e.g., nitrogen) during the latter part of the heating step.

In order to disclose more clearly the nature of the present invention and the advantages thereof, reference will hereinafter be made to certain specific embodiments which illustrate the flexibility of the herein-described process. It should be clearly understood, however, that this is done solely by way of example and is not to be construed as a limitation upon the spirit and the scope of the appended claims.

EXAMPLE 1

This example shows the effect of varying oleum to DNN ratios. The procedure was as outlined previously, with the water quench being omitted. The total hexane/DNN ratio was 4:1. The data are shown in Table III.

TABLE III

*Effect of Varying Oleum/DNN Ratios*

| Oleum/DNN (weight ratio) | Grams 100% Na sulfonate/ grams DNN | Combining weight | Percent salt |
| --- | --- | --- | --- |
| 1.00 | 0.85 | 517 | 0.45 |
| 1.10 | 0.87 | 507 | 0.34 |
| 1.20 | 0.84 | 514 | 0.52 |
| 1.30 | 0.99 | 513 | 0.51 |
| 1.40 | 1.06 | 513 | 0.60 |
| 1.50 | 1.09 | 507 | 0.56 |

EXAMPLE 2

Products prepared without a water quench gave a white precipitate, which appeared to be a polysulfonated alkylated binaphthyl, in the hexane-sulfonic acid solution. While the use of the water quench eliminated the white precipitate, it also decreased the yield. This example shows the effect of varying amounts of water in the quench. An oleum/DNN ratio of 1:1 was used. The data are shown in Table IV. Use of more than 0.18 $H_2O$ oleum served no useful purpose.

TABLE IV

*Effect of Varying Amounts of Water in Quench*

| Water/oleum ratio (weight) | Precipitate | Grams 100% sulfonate/ grams DNN |
| --- | --- | --- |
| 0 | Heavy | 0.88 |
| 0.09 | Very slight | 0.84 |
| 0.18 | do | 0.83 |
| 0.27 | do | 0.80 |
| 0.36 | do | 0.77 |

EXAMPLE 3

This example shows the effect of using hexane dilution with and without the water quench. An oleum/DNN ratio of 1.3 was used. In addition, it shows the effect of sulfonating in hexane as compared to white oil. The data are shown in Table V.

TABLE V

*Combined Effects of Hexane Dilution and Water Quench*

| Hexane/ DNN | White precipitate | Water/ oleum (weight) | Grams 100% sulfonate/ grams DNN | Combining weight | Percent salt |
| --- | --- | --- | --- | --- | --- |
| [1] 4.0 | Moderate | 0 | 1.10 | 493 | 2.45 |
| [1] 4.0 | Very slight | 0.18 | 1.11 | 481 | 0.86 |
| [2] 1.0 | Heavy | 0 | 0.98 | 480 | 5.68 |
| [2] 1.0 | Slight | 0.18 | 0.91 | 471 | 1.32 |
| [3] 0 | | 0 | .41 | | |
| [4] 5.0 | | 0 | 1.06 | | |

[1] Sulfonated at hexane/DNN ratio of 1:1, with subsequent dilution, after water quench, to the indicated ratio.
[2] Sulfonated at hexane/DNN ratio of 1:1, with no subsequent hexane dilution.
[3] Sulfonated in white oil (5-1 dilution) with 1.0 part oleum.
[4] Sulfonated in hexane (5-1 dilution) with 1.0 part oleum.

EXAMPLE 4

This example shows the effect of water-washing the hexane solution of sulfonate. An oleum/DNN ratio of 1:1 and a water to DNN ratio of 2.67:1 were used in the example. Data on two products prepared in this manner are shown in Table VI.

TABLE VI

*Water-Washing of the Sodium Sulfonate*

| Product No. | Combining weight of sodium sulfonate | Oil solubility | Percent sodium sulfate |
|---|---|---|---|
| A—Without water wash | 453 | Insoluble-haze | 0.64 |
| With water wash | 474 | Soluble-clear | 0.17 |
| B—Without water wash | 458 | Insoluble-haze | 1.65 |
| With water wash | 475 | Soluble-clear | 0.34 |

While particular embodiments of the invention have been described, it will be understood, of course, that the invention is not limited thereto, since many modifications may be made; and it is therefore, contemplated to cover by the appended claims any such modifications as fall within the true spirit and scope of the invention.

The invention having thus been described, what is claimed and desired to be secured by Letters Patent is:

1. A process for the production of oil-soluble dinonylnaphthalene sulfonate, said process comprising the steps of:
    (a) sulfonating dinonylnaphthalene dissolved in 1–4 parts of nonaromatic hydrocarbon solvent, having a boiling point of less than 150° C., per part of dinonylnaphthalene with a sulfonating agent selected from the group consisting of oleum and sulfur trioxide;
    (b) quenching the sulfonic acid reaction mixture with an amount of water in the range of about 0.10 to about 0.20 part by weight per part of total $SO_3$ in said sulfonating agent;
    (c) diluting the water-quenched reaction mixture with nonaromatic hydrocarbon solvent to a total solvent to dinonylnaphthalene ratio of 2.5 to 4.5 parts of solvent per part of dinonylnaphthalene (weight basis);
    (d) allowing the reaction mixture to stratify and removing the sludge;
    (e) neutralizing the sulfonic acid with a basic compound selected from the group consisting of alkali metal hydroxides, alkali metal carbonates, ammonium hydroxide, and ammonium carbonate;
    (f) washing the solution of sulfonate with from about 2.5 to about 4 parts of water per part of dinonylnaphthalene;
    (g) allowing the aqueous and hydrocarbon layers to stratify and removing the aqueous layer;
    (h) removing solvents and residual water from the dinonylnaphthalene sulfonate.

2. The process of claim 1 wherein the sulfonating agent is oleum.

3. The process of claim 1 wherein the nonaromatic hydrocarbon solvent is hexane.

4. The process of claim 1 wherein the nonaromatic hydrocarbon solvent is pentane.

5. The process of claim 1 wherein the nonaromatic hydrocarbon solvent is a petroleum naphtha treated to remove aromatic constituents.

6. The process of claim 1 wherein the amount of solvent in step (a) is about 1 part per part of dinonylnaphthalene.

7. The process of claim 6 wherein the aliphatic hydrocarbon solvent is hexane.

8. The process of claim 6 wherein the aliphatic hydrocarbon solvent is pentane.

9. The process of claim 6 wherein the aliphatic hydrocarbon solvent is a petroleum naphtha treated to remove aromatic constituents.

10. The process of claim 1 wherein the sulfonating agent is sulfur trioxide.

11. The process of claim 10 wherein the solvent of step (a) is hexane.

References Cited in the file of this patent

UNITED STATES PATENTS

| | | |
|---|---|---|
| 2,573,675 | Bloch et al. | Nov. 6, 1951 |
| 2,575,807 | Griesinger | Nov. 20, 1951 |
| 2,652,427 | Shultz | Sept. 15, 1953 |
| 2,764,548 | King et al. | Sept. 25, 1956 |

UNITED STATES PATENT OFFICE
CERTIFICATE OF CORRECTION

Patent No. 3,075,005 January 22, 1963

Robert L. Carden et al.

It is hereby certified that error appears in the above numbered patent requiring correction and that the said Letters Patent should read as corrected below.

Column 5, line 24, for "sulfonate" read -- sulfonates --; column 6, lines 14, 16, 18 and 21, for the claim reference numeral "1", each occurrence, read -- 2 --.

Signed and sealed this 3rd day of September 1963.

(SEAL)
Attest:

ERNEST W. SWIDER
Attesting Officer

DAVID L. LADD
Commissioner of Patents